United States Patent [19]

Matsuura et al.

[11] Patent Number: 5,137,863
[45] Date of Patent: Aug. 11, 1992

[54] PROCESS FOR CONTROLLING DEGREE OF DISPERSION OF ACTIVE COMPONENT OF METAL/CARRIER SOLID CATALYST

[75] Inventors: Ikuya Matsuura, Toyama; Yasushi Yoshida, Ube; Osamu Takayasu, Imizu; Kuniaki Nitta, Ube, all of Japan

[73] Assignee: Ube Industries, Ltd., Yamaguchi, Japan

[21] Appl. No.: 775,086

[22] Filed: Oct. 11, 1991

[30] Foreign Application Priority Data

Oct. 16, 1990 [JP] Japan .................................. 2-275371
Apr. 26, 1991 [JP] Japan .................................. 3-188391
Apr. 26, 1991 [JP] Japan .................................. 3-188392

[51] Int. Cl.$^5$ .......................... B01J 23/58; B01J 23/78
[52] U.S. Cl. .................................. 502/328; 502/100; 502/161; 502/170; 502/171; 502/201; 502/300
[58] Field of Search ............... 502/100, 161, 170, 171, 502/201, 300, 328

[56] References Cited

U.S. PATENT DOCUMENTS 4,997,802  3/1991  Matsuura et al. ............. 502/328 X
5,053,379 10/1991  Giordano et al. ............. 502/328

OTHER PUBLICATIONS

Catalyst Lectures, vol. 5, Catalyst Design, p. 39, 1985, compiled by Catalyst Society of Japan and published by Kodansha.

Catalyst Lectures, Special Edition, Catalyst Experiment Handbook, p. 15, 1986, compiled by Catalyst Society of Japan and published by Kodansha.

*Primary Examiner*—Patrick P. Garvin
*Attorney, Agent, or Firm*—Finnegan, Henderson, Farabow, Garrett & Dunner

[57] ABSTRACT

Disclosed is a process for controlling the degree of dispersion of a catalyst active component in the preparation of a metal/carrier solid catalyst, which comprises dry-blending an ultra-fine single crystal carrier material and an active component metal material, molding the blend, heating and maintaining the molded body in an inert gas at a temperature higher than and close to the melting point of the active component metal material, and heat-treating the molded body in the same atmosphere gas at a temperature higher than the decomposition temperature of the active component metal material.

5 Claims, No Drawings

PROCESS FOR CONTROLLING DEGREE OF DISPERSION OF ACTIVE COMPONENT OF METAL/CARRIER SOLID CATALYST

BACKGROUND OF THE INVENTION (1) Field of the Invention

The present invention relates to a process for controlling the degree of dispersion of a metal/carrier solid catalyst. This process can be generally applied to various processes for the production of catalysts of this type.

(2) Description of the Related Art

As the preparation process for dispersing a catalyst, the following processes are known; [Catalyst Lectures, volume 5, Catalyst Design, page 39 (1985), compiled by Catalyst Society of Japan and published by Kodansha, and ibid, Special Edition, Catalyst Experiment Handbook, page 15 (1986)].

(1) Impregnation Process

This process is well-known as a simple means of preparing a carrier-supported catalyst. According to this process, a solid acting as the carrier is immersed in a solution containing a compound of a catalyst active component, or a solution of the catalyst active component is dropped into the carrier, and the mixture is stirred and optionally heated. After a certain time, excess solvent is removed, the residue is dried and fired at a high temperature, and an activation required for each catalyst is carried out. According to the means for impregnating the carrier with a starting material of the catalyst active component, this process is divided into an adsorption method, a pore-filling method, an incipient wetness method, an evaporation-to-dryness method and a spray method.

(a) Adsorption method

According to this method, the amount of a catalyst active component, such as a metal ion, to be adsorbed in a carrier, is predetermined, and an amount, smaller than the saturation absorption amount, of the catalyst active component is completely adsorbed. Note, the method in which a carrier is immersed in a solution containing the active component in an amount exceeding the saturation absorption amount, and the excess portion is removed by filtration, is called an equilibrium adsorption method.

(b) Pore-filling method

As seen from the name thereof, according to this method the pore volume of a carrier is measured, a solution of an active component is added to the carrier in a volume equal to the measured pore volume, and all of the active component is sucked into the carrier.

(c) Incipient wetness method

According to this method the impregnation is performed while measuring the pore volume of a carrier. More specifically, while a carrier is being stirred, a solution of an active component is gradually added to the carrier by a buret or the like, and the addition is continued until a state is reached wherein the surface of the carrier is uniformly wetted and no excess solution is present. The amount supported of the active component is adjusted by changing the concentration of the active component in the solution.

(d) Evaporation-to-dryness method

A carrier is immersed in a solution of an active component and the mixture is heated with stirring on a hot water bath or the like, to evaporate the solvent (water or the like) and dry and fix an intermediate of the active component to the carrier. Where an increase of the amount supported of the active component is desired, or the compatibility between the carrier and the catalyst component is low, this method is adopted. The method is defective, however, in that the active component is not uniformly dispersed.

(e) Spray method

A carrier is charged in an evaporator and stirring is conducted while removing air. The carrier is always kept in a dry state and a solution of an active component is sprayed onto the carrier to effect impregnation.

(2) Ion Exchange Process

A zeolite, zirconium phosphate or an oxide having a surface acidity is used as a carrier, and the carrier is immersed in a solution containing an active component as a cation to effect an ion exchange and support the active component on inner walls of pores of the carrier. Post treatments are conducted according to the procedures described above with respect to the impregnation process.

(3) Co-precipitation Process

A precipitant is added to a mixed solution containing a carrier component and a catalyst active component to simultaneously form a precipitate of both components. Namely, solutions of both components are separately dropped into a solution of the precipitant or a mixed solution is dropped into the solution of the precipitant, whereby a precipitate is formed. The formation of the precipitate is influenced by various factors such as the starting materials, the kind of solvent, the solvent concentration, the amount of solution, the kind of precipitant, the pH value, the solution-precipitant mixing method, the stirring speed, and the temperature. As the treatment after the precipitation, an aging, ion exchange and washing are carried out according to need. Post treatments after the precipitation and drying are carried out according to the procedures described above with respect to the impregnation process.

(4) Deposition Process

A carrier is immersed in a solution of a catalyst active component, and a precipitant is added to the mixture with stirring to deposit a precipitate of the active component on the carrier. Often the precipitate of the active component is unevenly deposited, and as the means for avoiding this disadvantage, there is known a uniform precipitation method using urea as the precipitant.

(5) Kneading Process

A precipitate of at least one catalyst active component is preformed, a powder, hydrogel or hydrosol of a starting material of a carrier is added to the precipitate, and the mixture is kneaded by a ball mill or a kneader.

(6) Hydrothermal Synthesis Process

This process is applied to the synthesis of a zeolite or lamellar silicate catalyst. The process is adopted when a starting material of a catalyst active component having a low water solubility is used, and according to this process, a catalyst crystal is synthesized in a high-temperature and high-pressure aqueous solution having a required solubilizing power. In general, a mineralizing agent such as (an alkali) is added, to increase the solubility of the crystal.

(7) Melting Process

At least two catalyst active components are melt-mixed at a high temperature in an electric furnace. An oxide (double accelerating iron catalyst formed from $Fe_3O_4$—$Al_2O_3$—$KNO_3$ as the starting material) is used, or alternatively, a metal (an Ni-Al alloy for a Raney catalyst) is used. When a metal is used, the melting is carried out in a reducing atmosphere (such as Ar or $N_2$).

(8) Gas Phase Synthesis Process

This process is characterized in that fine powders of various catalysts are synthesized. The process is divided into (a) a method of evaporation-condensation of a starting material of a catalyst and (b) a method in which a chemical reaction is caused in the gas phase. According to the method (a), a starting material is heated by arc or plasma, and a vapor formed by gasification is rapidly cooled at a large temperature gradient possessed by an arc or plasma flame, to condense the vapor into fine particles. According to the method (b), fine particles of an intended substance are synthesized by thermal decomposition of a vapor of a volatizable catalyst compound or gas phase reaction of the vapor with other gas. A metal chloride, which has a high vapor pressure and a relatively high reactivity, is often used as the starting material of the catalyst in this method.

Each of the processes (1) through (6) is a process (wet process) utilizing a solubility or dispersibility of the active component in a liquid phase at normal temperature, and in each of these processes, a cumbersome operation of removing the solvent after the dispersion must be performed, or a problem of an increase in the costs inevitably arises. Furthermore, the used active component is not completely utilized, and thus a considerable amount of the active component is lost.

Each of the processes (7) and (8) is a dry process and a solvent is not used, and therefore, the above-mentioned problems are overcome. Nevertheless, since the dispersibility at a considerably high temperature in a liquid phase state or gas phase state is utilized, the labor and costs are still high. Furthermore, the applicable catalysts are very restricted.

A more serious problem arises in that the dispersion is not possible to be freely controlled. In each of the processes (1) through (8), a high dispersion can be effectively attained, but it is difficult to control the degree of dispersion.

It is known that, as a catalyst is highly dispersed the activity is generally enhanced, and accordingly, to increase the activity, it is necessary to attain a high degree of dispersion. If the dispersion degree is excessively increased, however, even though a high activity is temporarily attained, the activity is reduced with the lapse of time by sintering or the like, and in the long run, the activity is reduced. Therefore, most preferably the active component is supported at an appropriate degree of dispersion.

SUMMARY OF THE INVENTION

According to the process of the present invention, all of the above-mentioned problems are solved at a stroke, and simultaneously, the degree of dispersion of an active component can be freely controlled.

The present invention is to provide a process capable of freely controlling the degree of dispersion of a catalyst active component, in which a metal/carrier solid catalyst is prepared under specific conditions described below by using an ultra-fine single crystal carrier material and an active component metal material.

More specifically, in accordance with the present invention, there is provided a process for controlling the degree of dispersion of a catalyst active component in the preparation of a metal/carrier solid catalyst, which comprises dry-blending an ultra-fine single crystal carrier material and an active component metal material, molding the blend, heating and maintaining the molded body in an inert gas at a temperature higher than and close to the melting point of the active component metal material, and heat-treating the molded body in the same atmosphere gas at a temperature higher than the decomposition temperature of the active component metal material.

DESCRIPTION OF THE PREFERRED EMBODIMENTS

The ultra-fine single crystal carrier material used in the present invention is, for example, a gas-phase-process magnesium oxide formed by placing a magnesium vapor in contact with an oxygen-containing gas in a turbulently diffused state, to oxidize the magnesium. This magnesium oxide has a high purity and properties of an ultra-fine single crystal (BET specific surface area of 5 to 170 $m^2/g$, specific surface area diameter of 100 to 2000 Å and purity higher than 99.98%). According to this gas phase oxidation, magnesium oxide having a desired average particle diameter within the above-mentioned range is very easily and economically advantageously obtained by changing the oxidation conditions. A variety of ultra-fine (specific surface area diameter of 100 to 2000 Å) single crystal materials can be used, and the carrier material is not limited to the above-mentioned magnesium oxide.

As the active component metal material used in the present invention, at least one metal element selected from the group consisting of nickel (Ni), ruthenium (Ru), rhodium (Rh), palladium (Pd) and platinum (Pt) is preferably used. As the precursor material, there can be mentioned acetylacetonato salts, nitrates, alkoxides, acetates and carbonyl salts. Any of the precursor material melting at a relatively low temperature, for example, a temperature lower than 300° C., and thermally decomposing at a temperature lower than 400° C. to form a metal oxide, can be used. For example, acetylacetonato-nickel has a melting point of 228° C. and a thermal decomposition temperature of about 300° C., and after the thermal decomposition, nickel oxide (NiO) is obtained.

The above-mentioned two starting materials, i.e., the ultra-fine single crystal carrier material and the active component metal material, are first mixed. The mixing method is not particularly critical if a uniform mixing is attained, and an ordinary dry-blending method can be adopted. The obtained powdery mixture is then molded by an ordinary dry-molding machine. Any dry-molding machine can be used. For example, dry compression molding machines such as a tableting machine and a briquetting machine can be used. The shape of the molded body (tablet) is not particularly critical, and spherical, columnar, annular and small particulate shapes can be adopted. The size is usually smaller than 20 mm, and an appropriate size is selected according to the intended use.

The tablet is heated and maintained at a temperature higher than and close to the melting point of the active component material in an atmosphere of an inert gas such as He, Ar or $N_2$, to uniformly melt-disperse the active component on the surface of the carrier material.

Then, in the same inert gas atmosphere, the molded body is heat-treated at a temperature higher than the decomposition temperature of the active component material, until the active component material is completely decomposed.

For example, where the ultra-fine single crystal magnesium oxide (having a specific surface area diameter of 100 to 2000 Å) and acetylacetonatonickel are used, both the starting materials are dry-mixed and molded, the molded body is heated and maintained in an inert gas at 230° to 250° C. for at least 10 minutes, and the molded body is heat-treated at 300° to 400° C. in the same atmosphere gas for at least 10 minutes.

According to need, the obtained catalyst tablet is subjected to an activation treatment after the preparation or just before use. Where the active component material is a nickel metal salt, the catalyst tablet is usually subjected to an activation treatment at a temperature higher than 300° C. in $H_2$ gas atmosphere, just before use.

In the above-mentioned preparation process, the degree of dispersion of the active component can be controlled by appropriately adjusting the amount supported of the active component and the specific surface area particle of the carrier material. The degree of dispersion of the active component means both the average particle diameter (d) of the active component and the number (N) of particles of the active component per unit surface area of the carrier.

The active component has a very sharp particle diameter distribution, and if the amount supported of the active component is increased, the average particle diameter d is increased and the particle number N becomes lower. If the specific surface area diameter of the carrier material is increased, both d and N are increased, and since this change is very regular, the control is possible.

For this control, preliminary experiments are carried out by using predetermined materials, to grasp the relationship between the amount supported of the active component and the specific surface area diameter to d and N, and the control can be performed based on this relationship.

The most remarkable effect of the present invention is that the degree of dispersion of the active component can be controlled by preparing a catalyst according to the process of the present invention. Furthermore, the following additional effects can be attained: (1) since a solvent is not used, a post treatment such as removal of the solvent is not necessary; (2) the preparation steps are simple; (3) there is no loss of the active component into a solvent; (4) because of the foregoing effects, the preparation cost is reduced; and (5) the present invention can be applied to a great variety of metal/carrier solid catalysts.

The present invention will now be described in detail with reference to the following examples, that by no means limit the scope of the invention.

EXAMPLE 1

Metallic magnesium was charged in a retort and heated at 1200° C. to generate a vapor, this vapor and air were introduced into a double-tube burner, and the magnesium vapor was oxidized while being jetted from a nozzle. With respect to three kinds of the obtained high-purity ultra-fine single crystal magnesium oxides, the BET specific surface area was determined, and it was found that these oxides had specific surface area diameters of 100 Å, 500 Å and 2000 Å, respectively. By observation through a transmission type electron microscope, it was then confirmed that the magnesium oxide particles were composed of uniform single crystal cubes.

The obtained magnesium oxide powder and a commercially available acetylacetonatonickel in predetermined amounts were mixed in a mortar, and the mixture was molded into cylinders having a length of 5 mm and a diameter of 5 mm by using an ordinary tabletting machine. Six different supported amounts of nickel, that is, 1 mole %, 2 mole %, 5 mole %, 10 mole %, 15 mole % and 30 mole %, based on the magnesium oxide, were adopted. The molded bodies were heat-treated at 230° C. while supplying He gas at a flow rate of 2000 ml/min, and in the same atmosphere gas, the temperature was elevated to 300° C., and the heat treatment was conducted for 3 hours.

Then, 5 g of the heat-treated catalyst tablet was subjected to a reducing treatment at 600° C. for 3 hours while supplying $H_2$ gas at a flow rate of 2000 ml/min, whereby the catalyst was activated.

With respect to each of the obtained Ni/MgO catalysts, the BET specific surface area was measured, the Ni specific surface area was measured by $H_2$ gas chemical adsorption, the micro-structure was observed by a transmission type electron microscope, and the Ni specific surface area diameter (average particle diameter d) and the number N of the Ni particles per unit area of magnesium oxide were determined.

Note, the determination of the Ni specific surface area diameter d was conducted based on the following suppositions.

(1) Ni particles had a spherical shape.
(2) The quantitative relationship between the adsorbed hydrogen atom and the Ni surface atom was 1:1.
(3) (100), (110) and (111) plane were equivalently exposed on surfaces of the Ni particles.

The following formulae (a) and (b) were used for the calculation of the Ni specific surface area diameter d and the Ni particle number N per unit area of magnesium oxide:

$$d = \frac{6}{\rho_{Ni} S_{Ni}} \quad \text{(a)}$$

wherein $\rho_{Ni}$ represents the true density of the Ni particles, and $S_{Ni}$ represents the specific surface area of the Ni particles, and $$N = \frac{6 M_{Ni} \cdot m}{\pi \rho_{Ni} M_{MgO} S_{MgO} \cdot d^3} \quad \text{(b)}$$

wherein $\rho_{Ni}$ is as defined above, $M_{Ni}$ represents the atomic weight of the Ni particles, $M_{MgO}$ represents the molecular weight of the MgO particles, m represents the amount supported of the Ni particles, and $S_{MgO}$ represents the specific surface area of the MgO particles.

The results of the calculation are shown in Table 1.

TABLE 1

| Amount Supported of Ni | Specific Surface Area Diameter of High-Purity Ultra-Fine Single Crystal Magnesium Oxide | | | | | |
|---|---|---|---|---|---|---|
| | 100 Å | | 500 Å | | 2000 Å | |
| | Ni particle diameter d (Å) | Ni particle number N (per/μm² MgO) | Ni particle diameter d (Å) | Ni particle number N (per/μm² MgO) | Ni particle diameter d (Å) | Ni particle number N (per/μm² MgO) |
| 1 mole % Ni/MgO | 20 | 3500 | 30 | 3400 | 40 | 10000 |
| 2 mole % Ni/MgO | 30 | 1600 | 50 | 1800 | 60 | 3500 |
| 5 mole % Ni/MgO | 50 | 500 | 100 | 550 | 120 | 1400 |
| 10 mole % Ni/MgO | 100 | 200 | 190 | 200 | 220 | 500 |
| 15 mole % Ni/MgO | — | — | 260 | 120 | 330 | 200 |
| 30 mole % Ni/MgO | — | — | 500 | 40 | 600 | 100 |

From the electron microscope photo, it was confirmed that the Ni particles had a spherical shape and a uniform particle diameter.

As apparent from the foregoing results, the degree of dispersion can be adjusted to an intended level by controlling the amount supported of the catalyst component and the specific surface area diameter of the carrier material.

For example, to obtain an average active component particle diameter d of 50 Å, the amount supported is adjusted to 5 mole % when the specific area diameter of the carrier material is 100 Å, when the specific surface area diameter is 500 Å, the amount supported is adjusted to 2 mole %, and when the specific surface area diameter is 2000 Å, the amount supported is adjusted to 1.5 mole %. When a desired particle number N of Ni is decided, the specific surface area diameter of magnesium oxide corresponding to this particle number is selected.

Comparative Example 1

Aqueous ammonia was added to an aqueous solution of magnesium nitrate to form magnesium hydroxide, and the magnesium hydroxide was fired at 800° C. to obtain liquid phase process magnesium oxide. With respect to this magnesium oxide, the BET specific surface area was determined and the electron microscope observation was carried out in the same manner as described in Example 1. It was found that the specific face area diameter was 200 Å but the magnesium oxide was amorphous and was not uniform in shape and size.

By using this magnesium oxide, an Ni/MgO catalyst was prepared in the same manner as described in Example 1, and the degree of dispersion of the active component Ni was similarly examined. As a result, it was found that the Ni particle diameter had a very broad distribution, and the tendency observed in Example 1 was not found with respect to the influence of the amount supported of Ni on the degree of dispersion.

EXAMPLES 2 THROUGH 4

Gas phase oxidation process high-purity ultra-fine single crystal magnesium oxide (having a BET specific surface area diameter 100 Å) was dry-blended with acetylacetonatonickel, and the mixture was molded into a cylinder having a length of 5 mm and a diameter of 5 mm by an ordinary compression molding machine. At this step, the amount supported of Ni was adjusted to 5 mole % as Ni. The molded body was heated at 230° C. in He gas current to melt the acetylacetonatonickel, and in the same atmosphere gas, the molded body was heat-treated at 300° C. to thermally decompose the nickel precursor. Then, 0.1 g. of the obtained 5 mole % Ni/MgO catalyst was packed into a microreactor, and was subjected to a reducing treatment at 800° C. in $H_2$ current for 3 hours. Subsequently, a reaction was carried out at a temperature of 600° C. (Example 2), 700° C. (Example 3) or 750° C. (Example 4) while supplying a mixed gas comprising $CH_4$, $CO_2$ and He at a volume ratio of 15/15/70 at a flow rate of 100 ml/min into the micro-reactor. Then, 2 ml of the discharge gas was sampled, the composition of the gas in the stationary state was determined by the gas chromatography, and the conversion of $CH_4$, the conversion of $CH_4$ to $H_2$, and the conversion of $CH_4$ to CO were calculated. The results are shown in Table 2. Note, the GHSV was 60000 $h^{-1}$ and the total pressure was 1 atmosphere.

TABLE 2

| Example No. | Reaction temperature (°C.) | Conversion (%) of $CH_4$ | Conversion (%) of $CH_4$ to $H_2$ | Conversion (%) of $CH_4$ to CO |
|---|---|---|---|---|
| 2 | 600 | 71 | 82 | 89 |
| 3 | 700 | 85 | 90 | 95 |
| 4 | 750 | 100 | 100 | 100 |

EXAMPLES 5 THROUGH 9

By using the 5 mole % Ni/MgO catalyst (Example 5) used in Examples 2 through 4, and a 1 mole % Rh/MgO catalyst (Example 6), a 1 mole % Ru/MgO catalyst (Example 7), a 1 mole % Pd/MgO catalyst (Example 8) and a 1 mole % Pt/MgO catalyst (Example 9), prepared in the same manner as described in Examples 2 through 4, the activity tests were carried out in the same manner as described in Examples 2 through 4. The reaction conditions adopted were a reaction temperature of 740° C., a GHSV of 60000 $h^{-1}$, and a total pressure of 1 atmosphere. The results are shown in Table 3.

TABLE 3

| Example No. | Catalyst | Conversion (%) of $CH_4$ | Conversion (%) of $CH_4$ to $H_2$ | Conversion (%) of $CH_4$ to CO |
|---|---|---|---|---|
| 5 | 5 mole % Ni/MgO | 91 | 99 | 100 |
| 6 | 1 mole % Rh/MgO | 88 | 99 | 100 |
| 7 | 1 mole % Ru/MgO | 90 | 100 | 100 |
| 8 | 1 mole % Pd/MgO | 84 | 99 | 100 |
| 9 | 1 mole % Pt/MgO | 85 | 99 | 100 |

EXAMPLES 10 THROUGH 12

Acetylacetonatonickel was added to gas phase oxidation process high-purity ultra-fine single crystal magnesium oxide (having a BET specific surface area diameter 100 Å) and these materials were mixed by a dry method. The mixture was molded into cylinders having a length of 5 mm and a diameter of 5 mm by an ordinary compression molding machine. At this step, the amount supported of Ni was adjusted to 5 mole % as Ni. The molded body was heated at 230° C. in He gas current to melt the acetylacetonatonickel, and in the same atmosphere gas, the heat treatment was conducted at 300° C. to thermally decompose the nickel precursor.

Then, 0.1 g of the obtained 5 mole % Ni/MgO catalyst was charged in a micro-reactor, and a reducing treatment was carried out at 800° C. in $H_2$ current for 3 hours. Subsequently, a reaction was carried out at 600° C. (Example 10), 700° C. (Example 11) or 750° C. (Example 12) while introducing a mixed gas comprising $CH_4/O_2/He$ at a volume ratio of 30/15/55 at a flow rate of 100 ml/min into the micro-reactor. Then, 2 ml of the exhaust gas was sampled, and the composition of the gas in the stationary state was determined by the gas chromatography and the conversion of $CH_4$, the conversion of $CH_4$ to $H_2$ and the conversion of $CH_4$ to CO were calculated. The results are shown in Table 4. Note, the GHSV was 60000 $h^{-1}$, and the total pressure was 1 atmosphere.

TABLE 4

| Example No. | Reaction temperature (°C.) | Conversion (%) of $CH_4$ | Conversion (%) of $CH_4$ to $H_2$ | Conversion (%) of $CH_4$ to CO |
| --- | --- | --- | --- | --- |
| 10 | 600 | 66 | 67 | 77 |
| 11 | 700 | 86 | 81 | 88 |
| 12 | 750 | 100 | 99 | 100 |

EXAMPLES 13 THROUGH 17

By using the 5 mole % Ni/MgO catalyst (Example 13) used in Examples 10 through 12, and a 1 mole % Rh/MgO catalyst (Example 14), a 1 mole % Ru/MgO catalyst (Example 15), a 1 mole % Pd/MgO catalyst (Example 16) and a 1 mole % Pt/MgO catalyst (Example 17), prepared in the same manner as described in Examples 10 through 12, the activity tests were carried out in the same manner as described in Examples 10 through 12. The reaction conditions adopted were a reaction temperature of 740° C., a GHSV of 60000 $h^{-1}$, and a total pressure of 1 atmosphere. The results are shown in Table 5.

TABLE 5

| Example No. | Catalyst | Conversion (%) of $CH_4$ | Conversion (%) of $CH_4$ to $H_2$ | Conversion (%) of $CH_4$ to CO |
| --- | --- | --- | --- | --- |
| 13 | 5 mole % Ni/MgO | 93 | 97 | 97 |
| 14 | 1 mole % Rh/MgO | 92 | 92 | 97 |
| 15 | 1 mole % Ru/MgO | 90 | 94 | 94 |
| 16 | 1 mole % Pd/MgO | 89 | 90 | 96 |
| 17 | 1 mole % Pt/MgO | 89 | 90 | 95 |

EXAMPLES 18 THROUGH 23

By using a 5 mole % Ni/MgO catalyst (Examples 18 and 19), a 30 mole % Ni/MgO catalyst (Examples 20 and 21) and a 0.5 mole % Pd/MgO catalyst (Examples 22 and 23), prepared in the same manner as described in Examples 10 through 12, the activity tests were carried out at a temperature of 675° or 775° C. and a GHSV of 72000 $h^{-1}$. The results are shown in Table 6.

TABLE 6

| Example No. | Catalyst | Reaction temperature (°C.) | Conversion (%) of $CH_4$ | Conversion (%) of $CH_4$ to $H_2$ | Conversion (%) of $CH_4$ to CO |
| --- | --- | --- | --- | --- | --- |
| 18 | 5 mole % Ni/MgO | 675 | 82 | 75 | 78 |
| 19 | " | 775 | 96 | 96 | 95 |
| 20 | 30 mole % Ni/MgO | 675 | 85 | 80 | 75 |
| 21 | " | 775 | 97 | 97 | 95 |
| 22 | 0.5 mole % Pd/MgO | 675 | 78 | 75 | 75 |
| 23 | " | 775 | 96 | 91 | 94 |

We claim:

1. A process for controlling the degree of dispersion of a catalyst active component in the preparation of a metal/carrier solid catalyst, which comprises dry-blending an ultra-fine single crystal carrier material and an active component metal material, molding the blend, heating and maintaining the molded body in an inert gas at a temperature higher than and close to the melting point of the active component metal material, and heat-treating the molded body in the same atmosphere gas at a temperature higher than the decomposition temperature of the active component metal material.

2. A process for controlling the degree of dispersion of a catalyst active component according to claim 1, wherein the ultra-fine single crystal carrier material is a high-purity single crystal magnesium oxide having a BET specific surface area of 5 to 170 m²/g (a BET specific surface area diameter of 100 to 2000 Å).

3. A process for controlling the degree of dispersion of a catalyst active component according to claim 1, wherein the active component metal material is an acetylacetonato metal salt, nitrate, alkoxide, acetate or carbonyl salt.

4. A process for controlling the degree of dispersion of a catalyst active component according to claim 1, wherein the active component metal material is nickel, ruthenium, rhodium, palladium or platinum salt.

5. A process for controlling the degree of dispersion of a catalyst active component according to any of claims 1 through 4, wherein the amount supported of the active component material and the specific surface area diameter of the carrier material are adjusted.

* * * * *

UNITED STATES PATENT AND TRADEMARK OFFICE
CERTIFICATE OF CORRECTION

PATENT NO.  : 5,137,863
DATED       : August 11, 1992
INVENTOR(S) : Ikuya MATSUURA, et al.

It is certified that error appears in the above-identified patent and that said Letters Patent is hereby corrected as shown below:

TITLE PAGE:

In item [30] Foreign Application Priority Data, please delete the following:

--Apr. 26, 1991   [JP]    Japan ................3-188391

Apr. 26, 1991   [JP]    Japan ................3-188392 --.

Signed and Sealed this

Twenty-eighth Day of September, 1993

Attest:

BRUCE LEHMAN

Attesting Officer    Commissioner of Patents and Trademarks